US006905142B2

(12) United States Patent
Do et al.

(10) Patent No.: US 6,905,142 B2
(45) Date of Patent: Jun. 14, 2005

(54) HYDRAULIC COUPLING

(75) Inventors: Tai Do, Fountain Valley, CA (US); Tung N. Le, Westminster, CA (US); Luis F. Lozano, Garden Grove, CA (US)

(73) Assignee: Huck Patents, Inc., Wilmington, DE (US)

( * ) Notice: Subject to any disclaimer, the term of this patent is extended or adjusted under 35 U.S.C. 154(b) by 0 days.

(21) Appl. No.: 10/669,734

(22) Filed: Sep. 24, 2003

(65) Prior Publication Data

US 2004/0056481 A1 Mar. 25, 2004

Related U.S. Application Data

(60) Provisional application No. 60/413,345, filed on Sep. 25, 2002.

(51) Int. Cl.[7] .................................................. F16L 55/00
(52) U.S. Cl. ............................ 285/89; 285/386; 285/92; 285/322
(58) Field of Search ................................. 285/386, 387, 285/388, 389, 81, 89, 92, 322

(56) References Cited

U.S. PATENT DOCUMENTS

| 1,312,584 | A | * | 8/1919 | Scott | 285/89 |
|---|---|---|---|---|---|
| 2,992,018 | A | * | 7/1961 | Rosan | 285/81 |
| 3,462,727 | A | * | 8/1969 | Damoisiaux et al. | 285/89 |
| 4,265,470 | A | * | 5/1981 | Danner | 285/89 |
| 5,058,930 | A | | 10/1991 | Schlosser | |
| 5,083,819 | A | | 1/1992 | Bynum | |
| 5,362,110 | A | | 11/1994 | Bynum | |
| 5,388,866 | A | | 2/1995 | Schlosser | |
| 5,586,790 | A | | 12/1996 | Bynum | |
| 6,302,447 | B1 | | 10/2001 | Lee | |
| 6,478,343 | B2 | * | 11/2002 | King Lee | 285/322 |

FOREIGN PATENT DOCUMENTS

| FR | 2832207 | 11/2001 |
|---|---|---|
| GB | 1173895 | 12/1969 |

* cited by examiner

*Primary Examiner*—David Bochna
(74) *Attorney, Agent, or Firm*—Brij K. Agarwal; Eckert Seamans Cherin & Mellott, LLC

(57) ABSTRACT

An improved hydraulic coupling includes a fitting and a nut that are threadably connectable together. The fitting includes a generally annular groove having a lateral frusto-conic engagement surface. The nut includes a plurality of elongated fingers that each include a projection having an outwardly-disposed edge. When the coupling is assembled, the edges are frictionally engaged with the engagement surface as a result of the elastic deflection of the fingers. The frusto-conic shape of the engagement surface provides progressively greater frictional resistance in a direction of unthreading of the coupling, whereby loosening of the coupling during operation of the fluid circuit is resisted.

5 Claims, 4 Drawing Sheets

HYDRAULIC COUPLING

CROSS-REFERENCE TO RELATED APPLICATION

The present application claims priority from U.S. Provisional Patent Application Ser. No. 60/413,345 filed Sep. 25, 2002, the disclosures of which are incorporated herein by reference.

FIELD OF THE INVENTION

The present invention relates generally to hydraulic fittings and, more particularly, to a self-locking hydraulic fitting.

BACKGROUND OF THE INVENTION

Various types of fluid couplings are employed in fluid circuits. Such fluid couplings are typically employed to connect together separate components of a fluid system, such as when a first tube is connected together with a second tube or with another structure such as a manifold block. Such fluid couplings generally are designed to provide substantially leak-free seals between connected components in a given environment.

Fluid couplings often include components that are tightly threaded together to provide the substantially leak-free seal. The threaded configuration of the components permits them to be easily connected together to assemble the hydraulic circuit, and are readily separated from one another, such as when the various components of the hydraulic circuit are in need of inspection, maintenance, and/or replacement.

One such type of environment in which fluid couplings are employed is in a hydraulic circuit. Hydraulic circuits typically involve the transfer of fluids at high temperatures and pressures in the presence of extreme vibrations. While known hydraulic couplings have been generally effective for their intended purposes, such hydraulic couplings have not been without limitation.

The high vibration environment of a hydraulic circuit, combined with the expansions and contractions of the components of a hydraulic circuit resulting from temperature changes and high pressures, causes the threaded portions of hydraulic fittings to gradually loosen, i.e., unthread, over time. Generally any loosening of a coupling will result in a leakage of the fluid from within the circuit, and progressively greater degrees of loosening typically cause progressively greater rates of fluid loss. It is thus highly desirable to provide a hydraulic fitting with a self-locking feature that resists unthreading in the typical hydraulic environment of high temperatures, pressures, and vibration.

SUMMARY OF THE INVENTION

An improved hydraulic coupling in accordance with the present invention meets and exceeds these and other needs. An improved hydraulic coupling includes a fitting and a nut that are threadably connectable together. The fitting includes a generally annular groove having a lateral frusto-conic engagement surface. The nut includes a plurality of elongated fingers that each include a projection having an outwardly-disposed edge. When the coupling is assembled, the edges are frictionally engaged with the engagement surface as a result of the elastic deflection of the fingers. The frusto-conic shape of the engagement surface provides progressively greater frictional resistance in a direction of unthreading of the coupling, whereby loosening of the coupling during operation of the fluid circuit is resisted.

Accordingly, an aspect of the present invention is to provide an improved coupling that provides a substantially leak-free seal between components of a fluid circuit.

Another aspect of the present invention is to provide an improved coupling that resists loosening in an environment of elevated and varying temperatures, pressures, and vibration.

Another aspect of the present invention is to provide an improved coupling having a plurality of fingers with protrusions that are frictionally engaged with a frusto-conic surface of another structure to provide progressively increasing frictional resistance in an unthreading direction.

Accordingly, an aspect of the present invention is to provide an improved coupling, the general nature of which can be stated as including a fitting and a nut. The fitting has a barrel, an externally threaded first nipple, and a second nipple. The first nipple protrudes away from the barrel in a first direction, and the second nipple protrudes away from the barrel in a second direction. The barrel includes an external surface that is structured to be engaged by a tool, and further includes an annular shelf disposed adjacent the external surface and a groove formed therein adjacent the shelf. The groove has an engagement surface that is undercut below the shelf and that is of a first frusto-conic shape that faces generally radially inwardly. The nut includes an internally threaded collar and a plurality of elongated fingers extending from the collar. The collar has an outer surface that is structured to be engaged by a tool. Each finger includes a deflectable bar and a projection. The projections each include a first surface and a second surface, with the first surface extending generally radially outwardly from the bar and being oriented generally perpendicular to the longitudinal extent of the bar, and with the second surface being of a second frusto-conic shape and facing generally radially outwardly, the first and second surfaces meeting at an edge. The first nipple and the collar are structured to be threadably connected together. The engagement surface has a vertex spaced from the barrel in the first direction, and the second surface has a vertex spaced from the barrel in the second direction. The bars are structured to be elastically deflected inwardly from a free state and the edges are structured to be frictionally engaged with the engagement surface when the coupling is assembled.

BRIEF DESCRIPTION OF THE DRAWINGS

A further understanding of the invention can be gained from the following Description of the Preferred Embodiment when read in conjunction with the accompanying drawings in which.

Similar numerals refer to similar parts throughout the specification.

DETAILED DESCRIPTION OF PREFERRED EMBODIMENT

Figure 1:
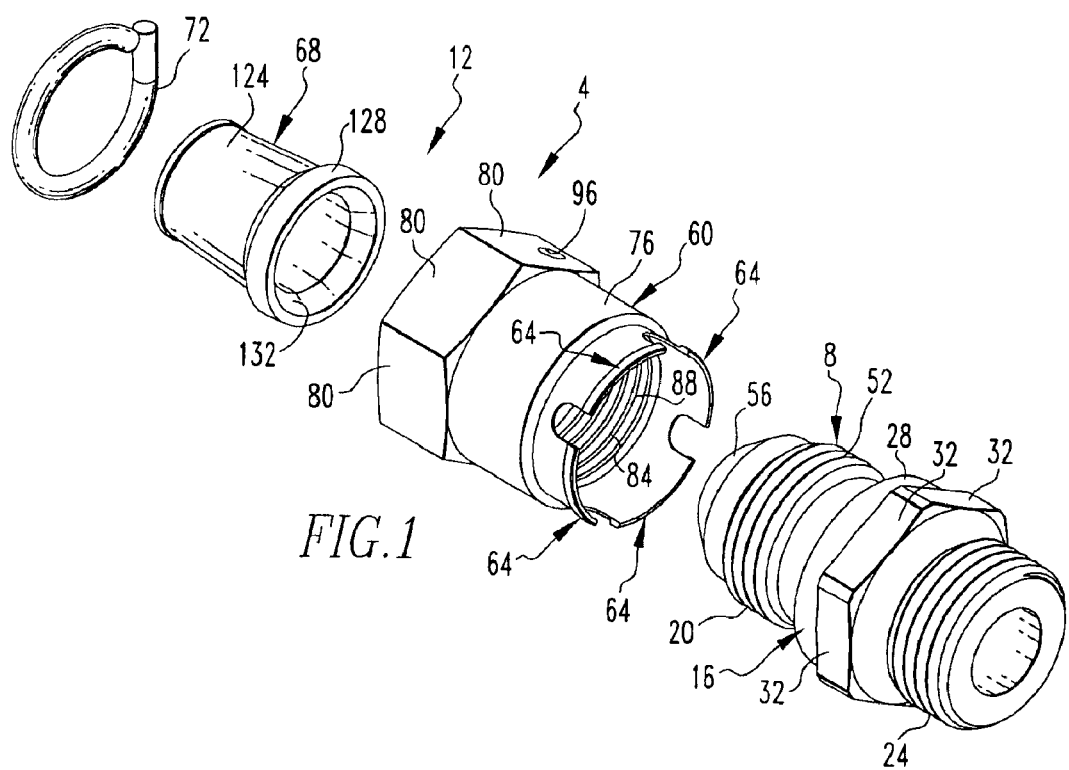
FIG. 1 is an exploded perspective view of an improved coupling in accordance with the present invention.
Figure 2:
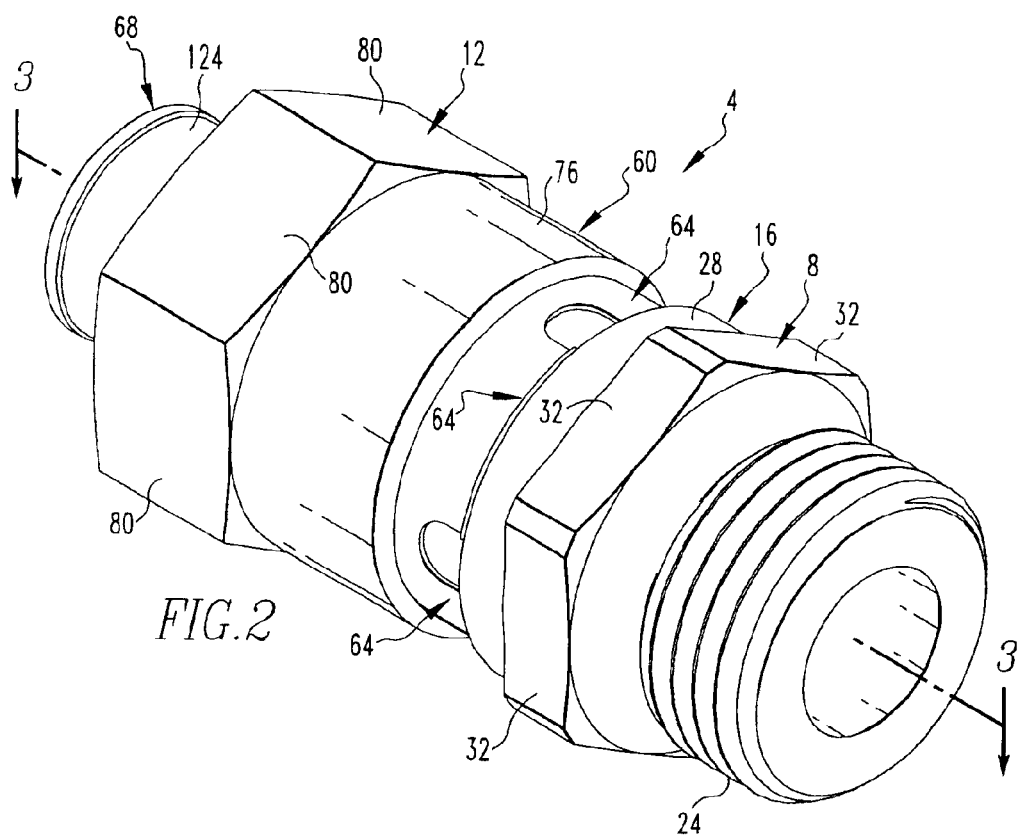
FIG. 2 is a perspective view of the coupling in a partially assembled condition.

An improved coupling 4 in accordance with the present invention is indicated generally in FIGS. 1–5. The coupling 4 is advantageously configured to provide a substantially leak-free seal between various components of a hydraulic circuit and to resists loosening in the presence of elevated and changing temperatures, pressures and vibration. While the exemplary fluid circuit described herein is a hydraulic circuit, it is noted that the coupling 4 can be employed in other fluid circuits, whether or not the fluid circuits are closed or open, i.e., whether or not they are continuous. The coupling 4 of the present invention advantageously includes a self-locking feature that resists loosening during use in its intended environment, as will be described in greater detail below.

In the broadest sense, the coupling 4 can be considered to include a fitting 8 and a nut 12. The fitting 8 and the nut 12 are threadably connectable together pursuant to the formation of the substantially leak-free seal therebetween. As can be understood, a first component (not expressly depicted) of a fluid circuit is associated with the fitting 8, and a second component (not expressly depicted) of the fluid circuit is associated with the nut 12, and when the fitting 8 and the nut 12 are connected together in the manner set forth below, the first and second components of the fluid circuit will be in substantially leak-free fluid communication with one another.

The fitting 8 includes a barrel 16, a first nipple 20, and a second nipple 24. The barrel 16 can be said to be disposed between the first and second nipples 20 and 24. The first nipple 20 protrudes in a first direction away from the barrel 16, and the second nipple 24 protrudes in a second, opposite direction away from the barrel 16.

As can be seen from FIG. 1, the exemplary coupling 4 depicted therein includes the first and second nipples 20 and 24 being of different configurations. The first nipple 20 is, as will be set forth in greater detail herein, threadably cooperable with the nut 12. The second nipple 24 is of a different configuration than the first nipple 20, and is configured to be threadably cooperable with a threaded hole formed in a manifold or other structure. It is noted that in other embodiments of the present invention the coupling 4 could include a pair of nipples that are each cooperable with nuts without departing from the concept of the present invention.

The barrel 16 includes an external surface 28 upon which are formed a plurality of flats 32 that function as engageable structures that are engageable by an appropriate tool such as a wrench or spanner. The barrel 16 additionally includes an annular shelf 36 (FIGS. 3–5) adjacent the external surface 28. A groove 40 is formed in the barrel adjacent the shelf 36, and the groove 40 includes a laterally disposed engagement surface 44 that is undercut in the region below the shelf 36, as can be best understood from FIGS. 4 and 5. The engagement surface 44 faces generally radially inwardly and is of a substantially frusto-conic shape that includes a first vertex 48 disposed at a position spaced in the aforementioned first direction from the barrel 16. It is understood that expressions such as "below", "above", "inwardly", "outwardly", and the like, as well as variations thereof, as used herein are not intended to be limiting.

The first nipple 20 includes external threading 52, and further includes a first seal surface 56 at the free end of the first nipple 20 opposite the barrel 16. The first seal surface 56 is of a substantially frusto-conic shape.

The nut 12 can be broadly described as including a collar 60, a plurality of fingers 64, a ferrule 68, and a thrust wire 72. In the exemplary embodiment depicted herein, the collar 60 and the fingers 64 are formed as a monolithic single-piece member.

Figure 3:
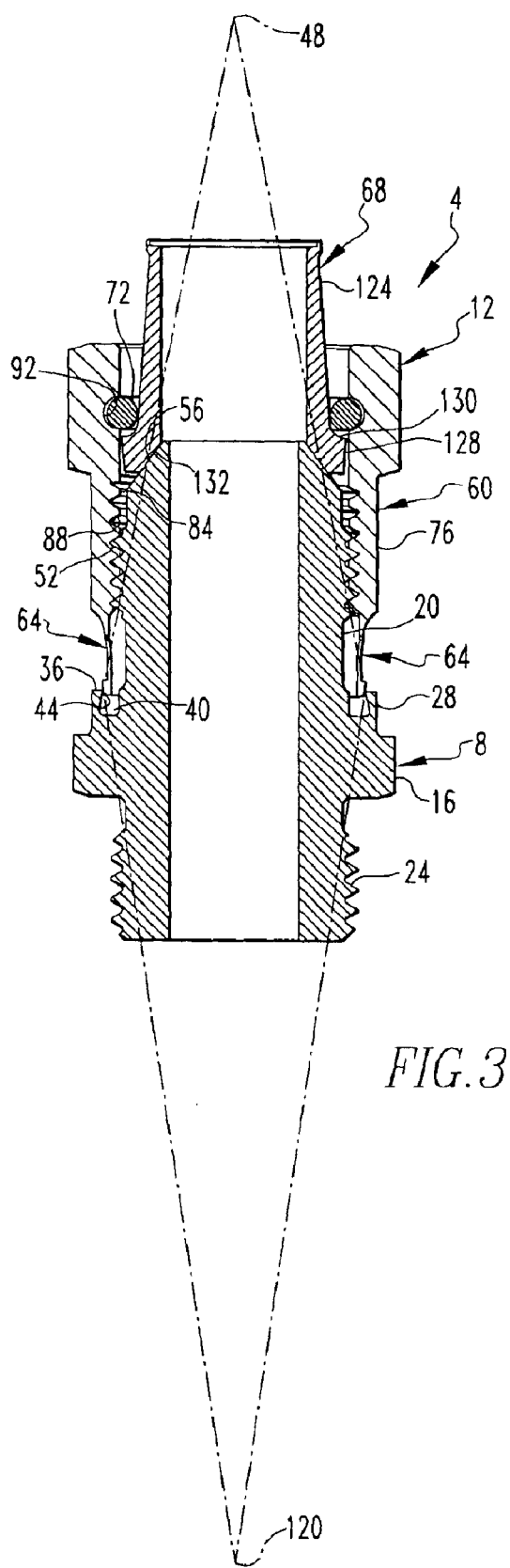
FIG. 3 is a sectional view as taken along line 3—3 of FIG. 2.
Figure 4:
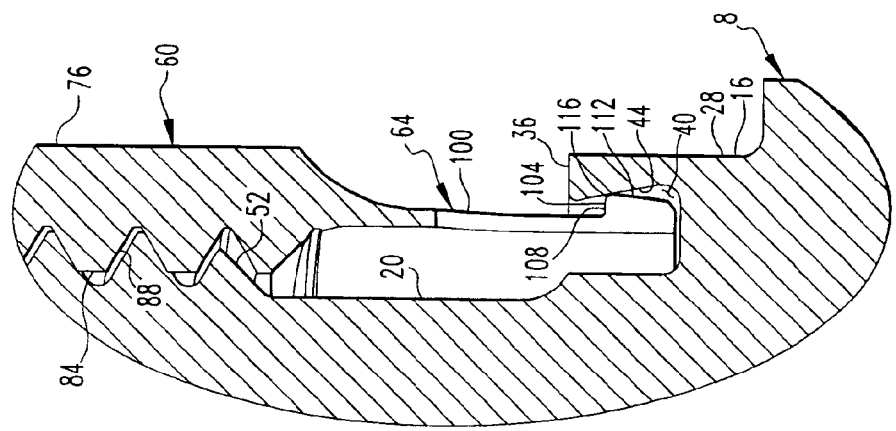
FIG. 4 is an enlarged view of a portion of FIG. 3, i.e., with the coupling in a partially assembled condition.

The collar 60 includes an outer surface 76 upon which are formed a plurality of flats 80 that serve as engageable structures that are engageable by an appropriate tool such as a wrench or spanner. As is best shown in FIG. 3, the collar 60 additionally includes an inner surface 84 upon which is formed internal threading 88. The inner surface 84 additionally includes a substantially annular channel 92 formed therein, and the channel 92 is in communication with a hole 96 (FIG. 1) that is formed in the collar 60 and extends from the channel 92 to the outer surface 76 of the collar 60. The thrust wire 72 is disposed in the channel 92 and in the hole 96.

Each finger 64 includes an elongated bar 100 (FIGS. 4 and 5) and a projection 104. The bars 100 extend in a direction generally parallel with one another and parallel with the longitudinal extent with the collar 60 from an end of the collar 60 generally opposite the channel 92. Each projection 104 is disposed on its corresponding bar 100 at the free end of the bar 100 opposite the collar 60. Each projection 104 includes a first surface 108 and a second surface 112 that intersect one another at an arcuate edge 116. The first surfaces 108 extend generally radially outwardly, i.e., with respect to the longitudinal extent of the collar 60, from the bars 100. The first surfaces 108 are, in the depicted embodiment, oriented roughly perpendicular to the longitudinal extent of the bar and, in the exemplary coupling 4 depicted herein, lie in a common plane.

The second surfaces 112 each face generally outwardly from the nut 12. the second surfaces 112 are of a substantially frusto-conic configuration, meaning that the second surfaces 112 lie on a common frusto-conic shape. The frusto-conic shape of the second surfaces 112 has a second vertex 120 (FIG. 3) that is disposed at a location spaced in the aforementioned second direction from the barrel 16.

The ferrule 68 includes a tube portion 124 and a flange 128 connected together. The flange 128 provides a lip 130 (FIG. 3) extending generally from the tube portion 124. The ferrule 68 includes a second seal surface 132 that is of a substantially frusto-conic shape.

As can be understood from FIG. 3, the first and second seal surfaces 56 and 132 are sealingly engageable with one another when the nut 12 is mounted on the first nipple 20. A first component of the fluid circuit, such as a piece of tubing (not shown) is received between the lip 130 and the thrust wire 72 and is tightly affixed therebetween in a sealing fashion when the nut 12 is threadably tightened on the fitting 8 as will be described in greater detail below. As such, the flange 128 can be said to be engageable with the thrust wire 72, albeit with a piece of tubing or other structure disposed therebetween.

Figure 5:
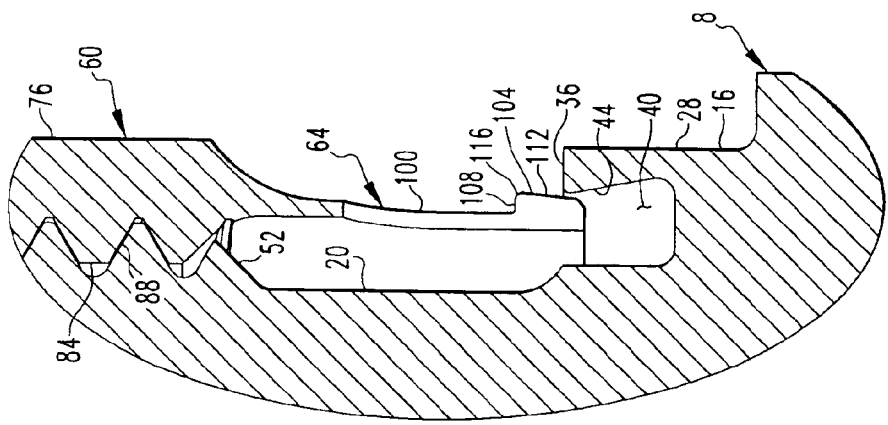
FIG. 5 is a view similar to FIG. 4, except depicting the coupling in an assembled condition.

The fingers 64 are elastically deflectable from a free state, i.e., an undeflected state, as is depicted generally in FIG. 1. The fingers 64 are in an elastically deflected condition when the coupling is assembled, such as is shown in FIG. 5, and also is in an elastically deflected condition during at least a portion of the assembly and disassembly of the coupling 4, as can be understood generally upon consideration of a transition in the condition of the coupling 4 between the condition depicted in FIG. 4 and that in FIG. 5. It is noted that the expression "partially assembled" and the like may refer generally to a condition in which the nut 12 and the fitting 8 are threadably connected together yet with the fingers 64 disengaged from the engagement surface 44, and it is further noted that the expression "assembled" may refer generally to a condition in which the fingers 64 are engaged with the engagement surface 44 with the coupling 4 torqued to an appropriate level. When the nut 12 and the fitting 8 are being threadably connected, the fingers 64 approach the groove 40 in an undeflected condition until the second surfaces 112 engage the barrel 16 at the region of intersection between the shelf 36 and the engagement surface 44. Further threading of the fitting 8 and the nut 12 from such point causes the fingers 64 to elastically deflect from their free state, as can be understood from FIGS. 4 and 5. Such threaded advancement of the nut 12 onto the fitting 8 causes progressively greater elastic deflection of the fingers 64 until the edges 116 have advanced past the shelf 36 and are engaged with the engagement surface 44. Such progressive elastic deflection of the fingers 64 prior to the point at which the edges 116 engage the engagement surface 44 results from the frusto-conic shape of the second surfaces 112 having the second vertex 120 spaced in the second direction from the barrel 16.

Once the edges 116 are engaged with the engagement surface 44, further threaded advancement of the nut 12 onto the fitting 8 results in reduced elastic deflection of the fingers 64 due to the undercut configuration of the engagement surface 44 in the region below the shelf 36. It is noted, however, that even upon fully assembling the coupling 4, such as depicted in FIG. 5, the fingers 64 are still in a condition elastically deflected from their free state such that the edges 116 remain frictionally engaged with the engagement surface 44.

It can further be understood from FIG. 5 that the elastic deflection of the fingers 64 advantageously continuously and progressively increases if the nut 12 is moved in an unthreading direction from an assembled condition, i.e., such as when the coupling 4 is disassembled. Such progressively increased deflection of the fingers 64 results in progressively increased engagement forces between the edges 116 and the engagement surface 44, thereby progressively increasing the frictional forces between the edges 116 and the engagement surface 44. Such frictional forces resist movement of the nut 12 in an unthreading direction with respect to the fitting 8. Such progressively increasing elastic deflection and frictional forces result from the frusto-conic shape of the engagement surface 44 having its first vertex 48 at the location spaced in the first direction from the barrel 16. The second surfaces 112 are oriented at a reverse angle with respect to the engagement surface 44 which permits the edges 116 to frictionally engage the engagement surface 44.

It thus can be seen that the frictional forces that resist unthreading of the nut 12 progressively increase with increased unthreading until such unthreading has progressed to the point that the edges 116 are beyond the range of the engagement surface 44. Such progressively increased resistance in the unthreading direction advantageously resists unintended loosening of the coupling 4 during operation as a result of elevated and/or changing pressures, temperatures, and vibration. The frictional engagement of the edges 116 with the engagement surface 44 when the coupling 4 is fully assembled provides a certain level of frictional resistance to movement of the nut 12 in the unthreading direction. If the forces seeking to unintentionally move the nut 12 in the unthreading direction, such as forces caused by temperatures, pressures, and vibration, overcome the initial frictional engagement between the edges 116 and the engagement surface 44, the resultant unthreading of the nut 12 will progressively increase the frictional resistance to such unthreading until such unintentional unthreading ceases. In this regard, it is understood that the various angles and deflection forces of the structures described herein can be tailored to provide specific properties for use in specific applications. Further in this regard, it is noted that the edges 116 remain continuously in contact with the engagement surface 44 in initially moving the coupling 4 in the unthreading direction from the assembled condition. Such continuity of contact promotes the progressive nature of the increase in frictional forces during initial unthreading of the coupling 4.

The initial frictional resistance to unthreading provided in the fully assembled condition, and the progressively increasing frictional resistance during unthreading, are advantageously in stark contrast to other systems which permit a certain amount of free loosening before any structures resist loosening, and further are in advantageous stark contrast to other systems in which frictional resistance to unthreading decreases upon initial unthreading of a nut. In this regard, it is noted that the frictional resistance referred to herein applies both to static friction as well as dynamic friction, in comparison with static and dynamic friction in other coupling devices, and it is further noted that the unintended unthreading of a nut as a result of temperatures, pressures, and vibration, typically will be a function of static friction properties, although this may not always be the case.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A coupling comprising:

a fitting having a barrel, an externally threaded first nipple, and a second nipple, the first nipple protruding away from the barrel in a first direction, the second nipple protruding away from the barrel in a second direction, the barrel having an external surface that is structured to be engaged by a tool, the barrel including an annular shelf disposed adjacent the external surface, the barrel having a groove formed therein adjacent the shelf, the groove having an engagement surface that is undercut below the shelf and that is of a first frusto-conic shape that faces generally radially inwardly;

a nut including an internally threaded collar and a plurality of elongated fingers extending from the collar, the collar having an outer surface that is structured to be engaged by a tool, each finger including a deflectable bar and a projection, the projections each including a first surface and a second surface, the first surface extending generally radially outwardly from the bar and being oriented generally perpendicular to the longitudinal extent of the bar, the second surface being of a second frusto-conic shape and facing generally radially outwardly, the first and second surfaces meeting at an edge;

the first nipple and the collar being structured to be threadably connected together;

the engagement surface having a vertex spaced from the barrel in the first direction;

the second surface having a vertex spaced from the barrel in the second direction; and the bars being structured to be elastically deflected inwardly from a free state and the edges being structured to be frictionally engaged with the engagement surface when the coupling is assembled.

2. The coupling of claim 1 wherein the nut includes a ferrule having a tube portion and an outwardly protruding flange;

the collar including an internal stop member; and the flange being structured to be engaged with the stop member.

3. The coupling of claim 2 wherein the stop member is a thrust wire disposed internally on the collar.

4. The coupling of claim 2 wherein the first nipple includes an exterior frusto-conic seal surface;

the ferrule including an interior frusto-conic seal surface; and the exterior and interior seal surfaces being sealingly engaged with one another.

5. The coupling of claim 1 wherein the bars are structured to be continuously and progressively elastically deflected inwardly when the coupling is moved in an unthreading direction from an assembled condition.

* * * * *